US011671298B2

(12) United States Patent
Papasakellariou et al.

(10) Patent No.: US 11,671,298 B2
(45) Date of Patent: *Jun. 6, 2023

(54) REFERENCE SIGNALS AND COMMON SEARCH SPACE FOR ENHANCED CONTROL CHANNELS

(71) Applicant: Samsung Electronics Co., Ltd., Gyeonggi-do (KR)

(72) Inventors: Aris Papasakellariou, Houston, TX (US); Hyoung-Ju Ji, Seoul (KR)

(73) Assignee: Samsung Electronics Co., Ltd

( * ) Notice: Subject to any disclaimer, the term of this patent is extended or adjusted under 35 U.S.C. 154(b) by 7 days.

This patent is subject to a terminal disclaimer.

(21) Appl. No.: 17/385,279

(22) Filed: Jul. 26, 2021

(65) Prior Publication Data

US 2021/0352642 A1    Nov. 11, 2021

Related U.S. Application Data

(63) Continuation of application No. 16/678,641, filed on Nov. 8, 2019, now Pat. No. 11,076,397, which is a
(Continued)

(51) Int. Cl.
*H04W 72/04* (2023.01)
*H04L 27/26* (2006.01)
(Continued)

(52) U.S. Cl.
CPC ........ *H04L 27/2613* (2013.01); *H04L 1/0046* (2013.01); *H04L 1/0071* (2013.01);
(Continued)

(58) Field of Classification Search
CPC ... H04L 1/0046; H04L 1/0071; H04L 1/0072; H04L 5/005; H04L 5/001; H04L 5/0053;
(Continued)

(56) References Cited

U.S. PATENT DOCUMENTS 8,705,461 B2    4/2014  Bala et al.
9,125,135 B2    9/2015  Parkvall
(Continued)

FOREIGN PATENT DOCUMENTS

JP    2012-506674    3/2012
KR    1020110093720  8/2011
(Continued)

OTHER PUBLICATIONS

Catt, "Considerations on E-PDCCH Multiplexing with PDSCH", R1-120110, 3GPP TSG RAN WG1 Meeting #68, Feb. 6-10, 2012, 3 pages.
(Continued)

*Primary Examiner* — Hoang-Chuong Q Vu
(74) *Attorney, Agent, or Firm* — The Farrell Law Firm, P.C.

(57) ABSTRACT

Methods and apparatuses for a User Equipment (UE) to receive signaling of UE-common Downlink Control Information (DCI) in a set of Physical Resource Blocks (PRBs) over a Transmission Time Interval (TTI) are provided. The method includes receiving, from a transmission point, a broadcast signal; determining a first set of PRBs for a first PDCCH based on the broadcast signal; determining a second set of PRBs for a second PDCCH based on a higher layer signaling; receiving, from the transmission point, first DCI on a first PDCCH in the first set of PRBs; and receiving, from the transmission point, second DCI on a second PDCCH in the second set of PRBs. A CRC of the first DCI is associated with an SI-RNTI, a CRC of the second DCI is associated with a C-RNTI, an RS is determined based on an identity of the transmission point, in a case that the RS is received in the first set of PRBs, and the RS is determined based on the higher layer signaling, in a case that the RS is received in the second set of PRBs.

20 Claims, 13 Drawing Sheets

Related U.S. Application Data continuation of application No. 15/445,356, filed on Feb. 28, 2017, now Pat. No. 10,477,529, which is a continuation of application No. 13/886,673, filed on May 3, 2013, now Pat. No. 9,585,125.

(60) Provisional application No. 61/642,174, filed on May 3, 2012.

(51) Int. Cl.
| | | |
|---|---|---|
| *H04L 5/00* | (2006.01) | |
| *H04L 25/02* | (2006.01) | |
| *H04L 1/00* | (2006.01) | |
| *H04W 72/20* | (2023.01) | |
| *H04W 72/23* | (2023.01) | |
| *H04W 72/51* | (2023.01) | |

(52) U.S. Cl.
CPC ............ *H04L 1/0072* (2013.01); *H04L 5/005* (2013.01); *H04L 5/0007* (2013.01); *H04L 5/0048* (2013.01); *H04L 5/0051* (2013.01); *H04L 5/0053* (2013.01); *H04L 25/0204* (2013.01); *H04L 25/0232* (2013.01); *H04W 72/20* (2023.01); *H04W 72/23* (2023.01); *H04L 5/0023* (2013.01); *H04L 5/0094* (2013.01); *H04W 72/51* (2023.01)

(58) Field of Classification Search
CPC ... H04L 5/0007; H04L 5/0071; H04L 5/0023; H04L 5/0094; H04L 25/0204; H04L 25/0232; H04L 27/2613
See application file for complete search history.

(56) References Cited

U.S. PATENT DOCUMENTS

| | | | |
|---|---|---|---|
| 9,166,737 B2* | 10/2015 | Papasakellariou | .... H04L 1/0073 |
| 9,276,659 B2 | 3/2016 | Noh et al. | |
| 9,467,819 B2 | 10/2016 | Niu | |
| 11,323,984 B2* | 5/2022 | Kim | ........................ H04L 5/0035 |
| 2009/0034505 A1 | 2/2009 | Papasakellariou | |
| 2009/0228891 A1 | 9/2009 | Tao | |
| 2010/0195566 A1 | 8/2010 | Krishnamurthy | |
| 2010/0195600 A1 | 8/2010 | Gorokhov | |
| 2010/0238877 A1 | 9/2010 | Nam | |
| 2010/0254329 A1 | 10/2010 | Pan | |
| 2010/0260154 A1 | 10/2010 | Frank | |
| 2011/0096704 A1 | 4/2011 | Erell et al. | |
| 2011/0171985 A1 | 7/2011 | Papasakellariou et al. | |
| 2011/0200143 A1 | 8/2011 | Koo | |
| 2011/0267997 A1* | 11/2011 | Seo | .................. H04B 7/15542 370/312 |
| 2011/0317748 A1 | 12/2011 | Li | |
| 2012/0008587 A1 | 1/2012 | Lee et al. | |
| 2012/0026935 A1 | 2/2012 | Park | |
| 2012/0039287 A1 | 2/2012 | Ko | |
| 2012/0087346 A1 | 4/2012 | Lee et al. | |
| 2012/0106465 A1 | 5/2012 | Haghighat | |
| 2012/0113898 A1 | 5/2012 | Luo | |
| 2012/0114014 A1 | 5/2012 | Gaal | |
| 2012/0128039 A1* | 5/2012 | Kim | ..................... H04L 5/0048 375/211 |
| 2012/0155561 A1 | 6/2012 | Seo | |
| 2012/0176884 A1 | 7/2012 | Zhang | |
| 2012/0190393 A1 | 7/2012 | Ishii | |
| 2012/0275400 A1 | 11/2012 | Chen | |
| 2013/0010684 A1* | 1/2013 | Park | ..................... H04L 5/0003 370/315 |
| 2013/0039203 A1 | 2/2013 | Fong | |
| 2013/0039284 A1* | 2/2013 | Marinier | ................ H04L 5/001 370/329 |
| 2013/0039291 A1 | 2/2013 | Blankenship | |
| 2013/0039299 A1 | 2/2013 | Papasakellariou | |
| 2013/0044664 A1 | 2/2013 | Nory | |
| 2013/0083753 A1 | 4/2013 | Lee | |
| 2013/0102320 A1* | 4/2013 | Suzuki | ................ H04W 72/042 455/452.1 |
| 2013/0107819 A1 | 5/2013 | Noh | |
| 2013/0155974 A1 | 6/2013 | Papasakellariou | |
| 2013/0163532 A1* | 6/2013 | Anderson | ............. H04L 5/0053 370/329 |
| 2013/0176978 A1 | 7/2013 | Abe | |
| 2013/0194931 A1 | 8/2013 | Lee | |
| 2013/0208678 A1 | 8/2013 | Zhang | |
| 2013/0230017 A1 | 9/2013 | Papasakellariou | |
| 2013/0258894 A1 | 10/2013 | Ogawa | |
| 2013/0343215 A1 | 12/2013 | Li | |
| 2014/0036822 A1 | 2/2014 | Maeda | |
| 2014/0044070 A1 | 2/2014 | Chen | |
| 2014/0112252 A1 | 4/2014 | Hoymann | |
| 2014/0185578 A1 | 7/2014 | Park | |
| 2015/0117291 A1 | 4/2015 | Seo | |

FOREIGN PATENT DOCUMENTS

| | | |
|---|---|---|
| WO | WO 2010/019019 | 2/2010 |
| WO | WO 2011/137383 | 11/2011 |

OTHER PUBLICATIONS

Nokia, Nokia Siemens Networks, E-PDCCH Design Principles, R1-114329, 3GPP TSG RAN WG1 Meeting #67, Nov. 14-18, 2011, 4 pages.

European Search Report dated Jan. 29, 2016 issued in counterpart application No. 13785232.3-1851, 10 pages.

LG Electronics, "Details of Reference Signals for E-PDCCH", R1-121453, 3GPP TSG RAN WG1 Meeting #68bis, Mar. 26-30, 2012, 6 pages.

LG Electronics, "Considerations on RS for E-PDCCH", ,R1-120874, 3GPP TSG RAN WG1 Meeting #68, Feb. 6-10, 2012, 4 pages.

European Search Report dated Jun. 7, 2018 issued in counterpart application No. 13785232.3-1219,1 0 pages.

Korean Office Action dated Feb. 4, 2020 issued in counterpart application No. 10-2014-7033540, 8 pages.

\* cited by examiner

REFERENCE SIGNALS AND COMMON SEARCH SPACE FOR ENHANCED CONTROL CHANNELS

PRIORITY

This application is a Continuation of U.S. patent application Ser. No. 16/678,641, which was filed in the U.S. Patent and Trademark Office (USPTO) on Nov. 8, 2019, which is a Continuation of U.S. patent application Ser. No. 15/445,356, which was filed in the USPTO on Feb. 28, 2017, issued as U.S. Pat. No. 10,477,529 on Nov. 12, 2019, which is a Continuation Application of U.S. patent application Ser. No. 13/886,673, which was filed in the USPTO on May 3, 2013, issued as U.S. Pat. No. 9,585,125 on Feb. 28, 2017, and claims priority under 35 U.S.C. § 119(e) to U.S. Provisional Application No. 61/642,174, which was filed in the USPTO on May 3, 2012, the entire disclosure of each of which is incorporated herein by reference.

BACKGROUND OF THE INVENTION

1. Field of the Invention

The present invention relates generally to wireless communication systems and, more particularly, to the transmission of physical downlink control channels.

2. Description of the Art

A communication system includes a DownLink (DL) that conveys transmission signals from transmission points, such as Base Stations (BS or NodeBs) to User Equipments (UEs), and an UpLink (UL) that conveys transmission signals from UEs to reception points, such as NodeBs. A UE, also commonly referred to as a terminal or a mobile station, may be fixed or mobile and may be a cellular phone, a personal computer device, etc. A NodeB is generally a fixed station and may also be referred to as an access point or some other equivalent terminology.

DL signals consist of data signals conveying information content, control signals conveying DL Control Information (DCI), and Reference Signals (RS), which are also known as pilot signals. A NodeB transmits data information or DCI to UEs through respective Physical DL Shared CHannels (PDSCHs) or DL Control CHannels (CCHs). UL signals also consist of data signals, control signals and RS. A UE transmits data information or UL Control Information (UCI) to a NodeB through a respective Physical Uplink Shared CHannel (PUSCH) or a Physical Uplink Control CHannel (PUCCH). It is possible for a UE having transmission of data information to also convey control information through the PUSCH.

A PDSCH transmission to a UE or a PUSCH transmission from a UE may be in response to dynamic scheduling or to Semi-Persistent Scheduling (SPS). With dynamic scheduling, a NodeB conveys to a UE a DCI format through a respective Physical DL Control CHannel (PDCCH). With SPS, a PDSCH or a PUSCH transmission is configured to a UE by a NodeB through higher layer signaling, such as Radio Resource Control (RRC) signaling, in which case it occurs at predetermined time instances and with predetermined parameters as informed by the higher layer signaling. A SPS PDSCH or a PUSCH transmission can be activated or deactivated by a PDCCH.

A NodeB may also transmit multiple types of RS including a UE-Common RS (CRS), a Channel State Information RS (CSI-RS), and a DeModulation RS (DMRS). The CRS is transmitted over substantially the entire DL system BandWidth (BW) and can be used by all UEs to demodulate data or control signals or to perform measurements. To reduce the overhead associated with the CRS, a NodeB may transmit a CSI-RS with a smaller density in the time and/or frequency domain than the CRS for UEs to perform measurements and transmit a DMRS only in the BW of a respective PDSCH and a UE can use the DMRS to demodulate the information in the PDSCH.

FIG. 1 illustrates a conventional transmission structure for a DL Transmission Time Interval (TTI).

Referring to FIG. 1, a DL TTI consists of one subframe 110 which includes two slots 120 and a total of $N_{symb}^{DL}$ symbols for transmitting data information, DCI, or RS. The first $M_{symb}^{DL}$ subframe symbols are used to transmit PDCCHs and other control channels 130 (not shown) including a Physical Control Format Indicator CHannel (PCFICH) transmitted in the first subframe symbol and indicating the number $M_{symb}^{DL}$ and Physical Hybrid ARQ Indicator CHannels (PHICHs) informing UEs whether respective PUSCHs were correctly or incorrectly received. The remaining $N_{symb}^{DL}-M_{symb}^{DL}$ subframe symbols are primarily used to transmit PDSCHs 140. The transmission BW consists of frequency resource units referred to as Resource Blocks (RBs). Each RB consists of $N_{sc}^{RB}$ subcarriers, or Resource Elements (REs), and a UE is allocated $M_{PDSCH}$ RBs for a total of $M_{sc}^{PDSCH} = M_{PDSCH} \cdot N_{sc}^{RB}$ REs for the PDSCH transmission BW. A time-frequency resource of one DL TTI and one RB is referred to as a Physical Resource Block (PRB). Some REs in some symbols contain CRS 150, CSI-RS or DMRS.

DCI can serve several purposes. A DCI format conveyed by a PDCCH may schedule a PDSCH or a PUSCH transmission. Another DCI format in a respective PDCCH may schedule a PDSCH providing System Information (SI) to UEs for network configuration parameters, or a response to a Random Access (RA) by UEs, or paging information, and so on. Another DCI format may provide to a group of UEs Transmission Power Control (TPC) commands for adjusting a respective transmission power for a PUSCH or a PUCCH.

A DCI format includes Cyclic Redundancy Check (CRC) bits in order for a UE to confirm a correct detection. The DCI format type is identified by a Radio Network Temporary Identifier (RNTI) that scrambles the CRC bits. For a DCI format scheduling a PDSCH or a PUSCH to a single UE, the RNTI is a Cell RNTI (C-RNTI). Also, a DCI format with a SPS-RNTI can activate or deactivate a SPS PDSCH or PUSCH transmission. A DCI format with a CRC scrambled by a C-RNTI or a SPS-RNTI will be referred to as providing UE-specific control information. For a DCI format scheduling a PDSCH conveying SI to a group of UEs, the RNTI is a SI-RNTI. For a DCI format scheduling a PDSCH providing a response to a RA from one or more UEs, the RNTI is a RA-RNTI. For a DCI format scheduling a PDSCH for Paging a group of UEs, the RNTI is a P-RNTI. For a DCI format providing TPC commands to a group of UEs, the RNTI is a TPC-RNTI. DCI formats with a SI-RNTI, or a RA-RNTI, or a P-RNTI, or a TPC-RNTI will be referred to as providing UE-common control information. Each RNTI type is configured to a UE through higher layer signaling (and the C-RNTI is unique for each UE).

FIG. 2 illustrates a conventional encoding process for a DCI format.

Referring to FIG. 2, a RNTI of a DCI format masks a CRC of a codeword in order to enable a UE to identify a DCI format type. The CRC 220 of the (non-coded) DCI format bits 210 is computed and it is subsequently masked 240 using the exclusive OR (XOR) operation between CRC and RNTI bits 220. This corresponds to XOR(0,0)=0, XOR(0, 1)=1, XOR(1,0)=1, XOR(1,1)=0. The masked CRC bits are then appended to the DCI format bits 250, channel coding is performed 260, for example using a convolutional code, followed by rate matching 270 to allocated resources, and finally by interleaving and modulation 280, and transmission of a control signal 290. For example, both the CRC and the RNTI consist of 16 bits.

FIG. 3 illustrates a conventional decoding process for a DCI format.

Referring to FIG. 3, a received control signal 310 is demodulated and the resulting bits are de-interleaved 320, the rate matching applied at a NodeB transmitter is restored 330, and an output is subsequently decoded 340. After decoding, DCI format bits 360 are obtained after extracting CRC bits 350 which are then de-masked 370 by applying the XOR operation with a RNTI 380. Finally, a UE receiver performs a CRC test 390. If the CRC test passes, the DCI format is considered valid and a UE determines the respective parameters for a signal reception or a signal transmission. If the CRC test does not pass, a UE disregards the presumed DCI format.

A NodeB separately codes and transmits a DCI format in a respective PDCCH. To avoid a PDCCH transmission to a UE blocking a PDCCH transmission to another UE, the location of a PDCCH transmission in the time-frequency domain of a DL control region is not unique. As a consequence, a UE needs to perform multiple decoding operations to determine whether there is a PDCCH intended for the UE. The REs of a PDCCH are grouped into Control Channel Elements (CCEs) in the logical domain and include all REs of a DL control region except for REs used to transmit CRS, PCFICH, or PHICH. For a given number of DCI format bits, a number of CCEs for a respective PDCCH depends on the channel coding rate (Quadrature Phase Shift Keying (QPSK) is assumed as the modulation scheme). A NodeB may use a lower channel coding rate (more CCEs) for PDCCH transmissions to UEs experiencing low DL Signal-to-Interference and Noise Ratio (SINR) than to UEs experiencing a high DL SINR. The CCE aggregation levels can consist, for example, of 1, 2, 4, and 8 CCEs.

FIG. 4 illustrates a conventional transmission process of DCI formats in respective PDCCHs.

Referring to FIG. 4, encoded DCI format bits are mapped to PDCCH CCEs. The first 4 CCEs (L=4), CCE1 401, CCE2 402, CCE3 403, and CCE4 404 are used to transmit a PDCCH to UE1. The next 2 CCEs (L=2), CCE5 411 and CCE6 212, are used to transmit a PDCCH to UE2. The next 2 CCEs (L=2), CCE7 421 and CCE8 422, are used to transmit a PDCCH to UE3. Finally, the last CCE (L=1), CCE9 431, is used to transmit a PDCCH to UE4. The DCI format bits may be scrambled 440 by a NodeB-specific binary scrambling code and are subsequently modulated 450. Each CCE is further divided into Resource Element Groups (REGs). For example, a CCE consisting of 36 REs may be divided into 9 REGs each consisting of 4 REs. Interleaving 460 is applied among REGs (blocks of 4 QPSK symbols). For example, a block interleaver may be used to accomplish the interleaving 460. The resulting series of QPSK symbols may be shifted by J symbols 470 and each QPSK symbol is finally mapped to an RE 480. Therefore, in addition to the CRS, 491, 492, and 493, PCFICH and PHICH (not shown), a DL control region includes PDCCHs providing DCI formats to UE1 494, UE2 495, UE3 496, and UE4 497.

For the PDCCH decoding process, a UE may determine a search space for candidate PDCCH transmissions after it restores the CCEs in the logical domain according to a UE-common set of CCEs (Common Search Space or CSS) and according to a UE-dedicated set of CCEs (UE-Dedicated Search Space or UE-DSS). The CSS may consist of the first CCEs in the logical domain and is primarily used for transmitting PDCCHs for DCI formats providing UE-common control information, but it may also be used for transmitting PDCCHs for DCI formats providing UE-specific control information. The UE-DSS consists of all CCEs and is entirely used for transmitting PDCCHs for DCI formats providing UE-specific control information. The CCEs of a UE-DSS may be determined according to a pseudo-random function having, as inputs, UE-common parameters, such as the subframe number or the total number of CCEs in a subframe, and UE-specific parameters such as a C-RNTI. For example, for CCE aggregation level $L \in \{1, 2, 4, 8\}$ CCEs, the CCEs corresponding to PDCCH candidate m are given by Equation (1).

$$\text{CCEs for PDCCH candidate } m = L \cdot \{(Y_k + m) \mod \lfloor N_{CCE,k}/L \rfloor\} + i \quad (1)$$

In Equation (1), $N_{CCE,k}$ is the total number of CCEs in subframe k, i=0, ..., L−1, m=0, ..., $M_C^{(L)}$−1, and $M_C^{(L)}$ is the number of PDCCH candidates to monitor in the UE-DSS. Exemplary values of $M_C^{(L)}$ for $L \in \{1,2,4,8\}$ are, respectively, $\{6, 6, 2, 2\}$. For the UE-DSS, $Y_k = (A \cdot Y_{k-1}) \mod D$ where $Y_{-1} = C\text{-RNTI} \neq 0$, A=39827 and D=65537. For the CSS, $Y_k = 0$.

The DL control region in FIG. 1 is assumed to occupy a maximum of $M_{symb}^{DL}$=3 subframe symbols and a PDCCH is transmitted substantially over an entire DL BW. This limits a PDCCH capacity of a DL control region and cannot support interference coordination in the frequency domain among PDCCH transmissions from different NodeBs or, in general, from different Transmission Points (TPs). Expanded PDCCH capacity or PDCCH interference coordination in the frequency domain is needed in several cases. One such case is a use of Remote Radio Heads (RRHs) in a network where a UE can receive DL signals either from a macro-NodeB or from an RRH. If the RRHs and the macro-NodeB share a same cell identity, cell splitting gains do not exist and expanded PDCCH capacity is needed to accommodate PDCCH transmissions from the macro-NodeB and the RRHs. Another case is for heterogeneous networks where DL signals from a pico-NodeB experience strong interference from DL signals from a macro-NodeB and interference coordination in the frequency domain among NodeBs is then needed.

Extending a conventional DL control region size to more than $M_{symb}^{DL}$=3 subframe symbols is not possible at least because of a requirement to support conventional UEs which cannot be aware or support such extension. An alternative is to support DL control signaling in a conventional PDSCH region by using individual PRBs to transmit control channels. These control channels will be referred to as enhanced Control CHannels (eCCHs) and may include an enhanced PDCCH (ePDCCH), an enhanced PHICH (ePHICH), or an enhanced PCFICH (ePCFICH).

FIG. 5 illustrates a conventional allocation of resources for transmitting eCCHs in a DL TTI.

Referring to FIG. 5, although eCCH transmissions start immediately after the conventional CCHs 510 and are over all remaining subframe symbols, they may instead always start at a predetermined location, such as the fourth subframe symbol. The eCCHs are transmitted in four PRBs per subframe, 520, 530, 540, and 550 while the remaining PRBs per subframe are used for PDSCH transmissions 560, 562, 564, 566, 568.

A UE can be configured by higher layer signaling the PRBs that may convey eCCHs. The transmission of an eCCH to a UE may be in a single PRB, if a TP has accurate CSI for the UE and can perform Frequency Domain Scheduling (FDS) or beam-forming for the eCCH transmission, or it may be in multiple PRBs, if accurate CSI for a UE is not available or if an eCCH is intended for multiple UEs. An eCCH transmission over a single PRB will be referred to as localized or non-interleaved while an eCCH transmission over multiple RBs will be referred to as distributed or interleaved. Interleaved eCCHs may include ePDCCH, ePCFICH, or ePHICH while non-interleaved eCCHs may be only ePDCCHs.

The design of enhanced search spaces in a set of assigned PRBs is not material to the present invention and may follow, for example, conventional techniques. Then, an ePDCCH may consist of respective eCCEs and a number of ePDCCH candidates may exist for each eCCE aggregation level. An eCCE may or may not have the same size as a conventional CCE and an eCCE for non-interleaved ePDCCHs may or may not have the same size as an eCCE for interleaved ePDCCHs. Similar to CCEs, the eCCEs are distributed over a virtual BW formed by the set of assigned PRBs in the respective symbols of a DL TTI.

FIG. 6 illustrates conventional REs of a PRB for transmitting eCCHs.

Referring to FIG. 6, REs of a PRB 610 are allocated to transmission of eCCHs 620 and may also be allocated to transmissions of CCHs 630, CSI-RS 640, and CRS 650. A PRB assigned to transmissions of eCCHs also includes REs allocated to DMRS from different Antenna Ports (APs). In case of four DMRS APs, REs are assigned for DMRS transmission from a first AP 660, DMRS transmission from a second AP 670, DMRS transmission from a third AP 680, and DMRS transmission from a fourth AP 690.

A UE performs coherent demodulation of eCCHs using a channel estimate obtained by DMRS in same PRBs as the associated eCCHs. As DMRS transmitted in a same PRB in different subframes cannot be assumed to be the same, for example an associated precoding may not be the same or the PRB may not be assumed as being always used to transmit eCCHs, and as PRBs assigned to eCCHs are typically dispersed in frequency, a channel estimate for demodulating eCCHs may only be based on a DMRS in each PRB per subframe. Absence of interpolation in a time or frequency domain may significantly degrade the accuracy of DMRS-based channel estimates and the reception reliability of eCCHs compared to that of CCHs. This is because for a CCH demodulation, a UE may obtain a channel estimate from a CRS that is substantially transmitted over all subframes and over the entire operating BW thereby enabling time and frequency interpolation, respectively.

A same or different DMRS may be transmitted from each AP. A DMRS may also be scrambled by a sequence which can be TP-specific or UE-specific. An eCCH may also be scrambled by a sequence than can be TP-specific or UE-specific in order to enable TP-agnostic transmission of eCCHs and multiple TPs to transmit a same eCCH. However, the latter operation is only possible after a UE has established access to a network and it can then be configured by higher layer signaling, either explicitly or implicitly, a DMRS scrambling sequence or an eCCH scrambling sequence. Prior to establishing access to a network, a UE-specific DMRS or eCCHs scrambling sequence is not possible and a respective UE-common scrambling sequence is instead needed. Moreover, a UE needs to know PRBs and respective subframes where a TP transmits UE-common DCI.

Therefore, there is a need to enhance the accuracy of a channel estimate obtained from a DMRS for coherent demodulation of enhanced control channels.

There is another need to support DMRS scrambling with a UE-specific sequence and with a UE-common sequence associated, respectively, with enhanced control providing UE-dedicated control information and UE-common control information.

Finally, there is another need to define resources for transmitting enhanced control channels providing UE-common control information.

SUMMARY OF THE INVENTION

The present invention has been made to address at least the problems and disadvantages described above, and to provide at least the advantages described below.

Accordingly, aspects of the present invention provide methods and apparatuses for a transmission point to transmit reference signals and DCI in PRBs conveying UE-common control information, to scramble reference signals and control information signals with respective scrambling sequences depending on the PRBs used for the transmissions of the signals, and for a UE to determine PRBs and respective subframes where a transmission point transmits UE-common control information, and to determine respective scrambling sequences for DMRS and DCI in PRBs conveying UE-common control information.

In accordance with an aspect of the present invention, a method performed by a UE is provided. The method includes receiving, from a transmission point, a broadcast signal; determining a first set of PRBs for a first PDCCH based on the broadcast signal; determining a second set of PRBs for a second PDCCH based on a higher layer signaling; receiving, from the transmission point, first DCI on a first PDCCH in the first set of PRBs; and receiving, from the transmission point, second DCI on a second PDCCH in the second set of PRBs. A CRC of the first DCI is associated with an SI-RNTI, a CRC of the second DCI is associated with a C-RNTI, an RS is determined based on an identity of the transmission point, in a case that the RS is received in the first set of PRBs, and the RS is determined based on the higher layer signaling, in a case that the RS is received in the second set of PRBs.

In accordance with another aspect of the present invention, a method performed by a transmission point is provided. The method includes transmitting, to a UE, a broadcast signal; determining a first set of PRBs for a first PDCCH based on the broadcast signal; determining a second set of PRBs for a second PDCCH based on a higher layer signaling; transmitting, to the UE, first DCI on a first PDCCH in the first set of PRBs; and transmitting, to the UE, second DCI on a second PDCCH in the second set of PRBs. A CRC of the first DCI is associated with an SI-RNTI, a CRC of the second DCI is associated with a C-RNTI, an RS is associated with an identity of the transmission point, in a case that the RS is transmitted in the first set of PRBs, and the RS is associated with the higher layer signaling, in a case that the RS is transmitted in the second set of PRBs.

In accordance with another aspect of the present invention, a UE is provided, which includes a transceiver; and a controller configured to receive, from a transmission point, via the transceiver, a broadcast signal, determine a first set of PRBs for a first PDCCH based on the broadcast signal, determine a second set of PRBs for a second PDCCH based on a higher layer signaling, receive, from the transmission point, via the transceiver, first DCI on a first PDCCH in the first set of PRBs, and receive, from the transmission point, via the transceiver, second DCI on a second PDCCH in the second set of PRBs. A CRC of the first DCI is associated with an SI-RNTI, a CRC of the second DCI is associated with a C-RNTI, an RS is determined based on an identity of the transmission point, in a case that the RS is received in the first set of PRBs, and the RS is determined based on the higher layer signaling, in a case that the RS is received in the second set of PRBs.

In accordance with another aspect of the present invention, a transmission point is provided, which includes a transceiver; and a controller configured to transmit, to a UE, via the transceiver, a broadcast signal, determine a first set of PRBs for a first PDCCH based on the broadcast signal, determine a second set of PRBs for a second PDCCH based on a higher layer signaling, transmit, to the UE, via the transceiver, first DCI on a first PDCCH in the first set of PRBs, and transmit, to the UE, via the transceiver, second DCI on a second PDCCH in the second set of PRBs. A CRC of the first DCI is associated with an SI-RNTI, a CRC of the second DCI is associated with a C-RNTI, an RS is associated with an identity of the transmission point, in a case that the RS is transmitted in the first set of PRBs, and the RS is associated with the higher layer signaling, in a case that the RS is transmitted in the second set of PRBs.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
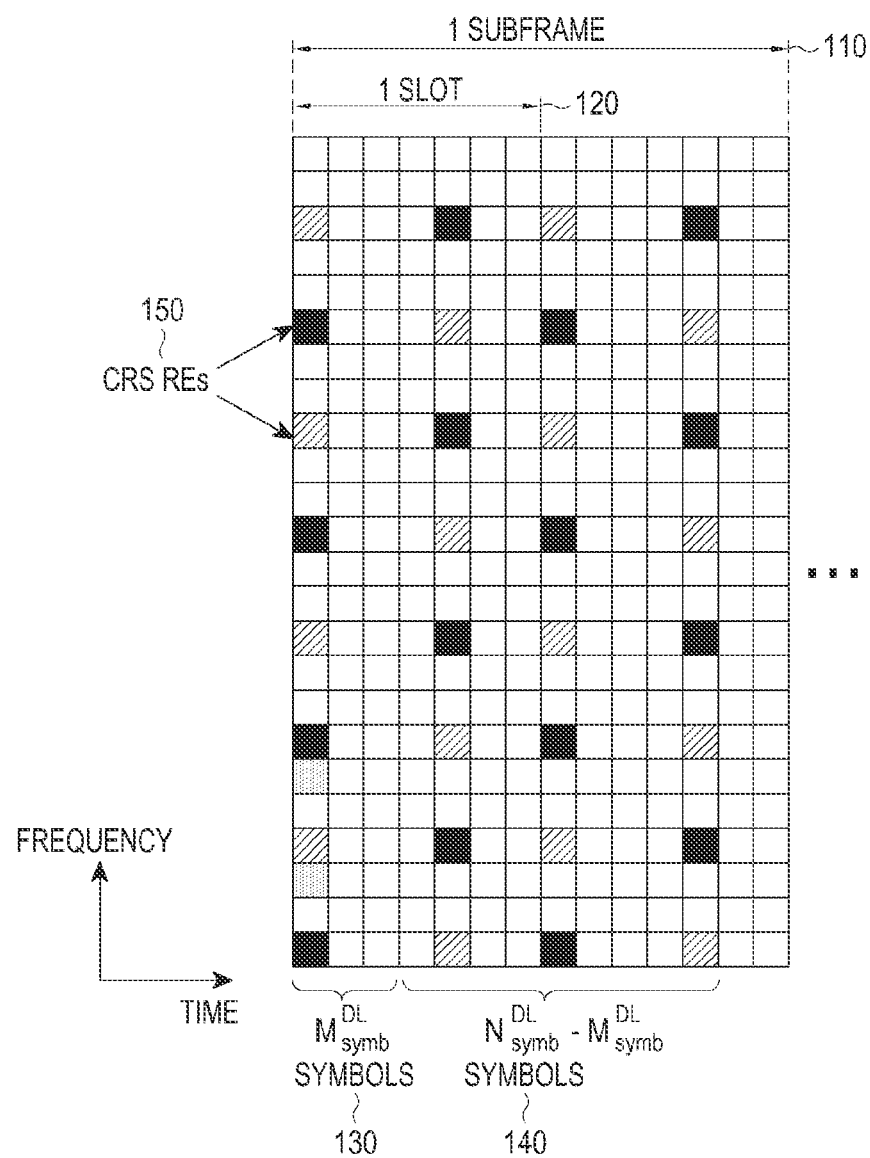
FIG. 1 is a diagram illustrating a conventional structure for a DL TTI.
Figure 2:
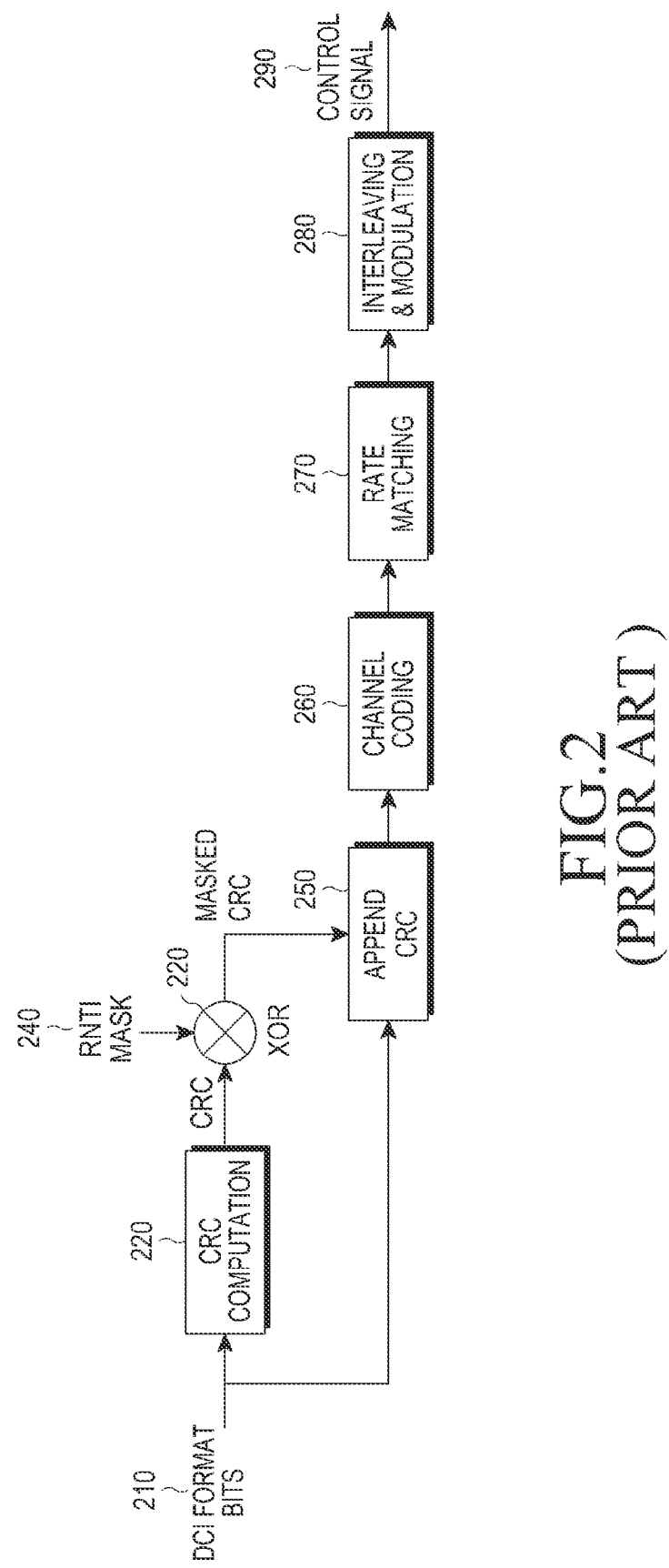
FIG. 2 is a block diagram illustrating a conventional encoding process for a DCI format.
Figure 3:
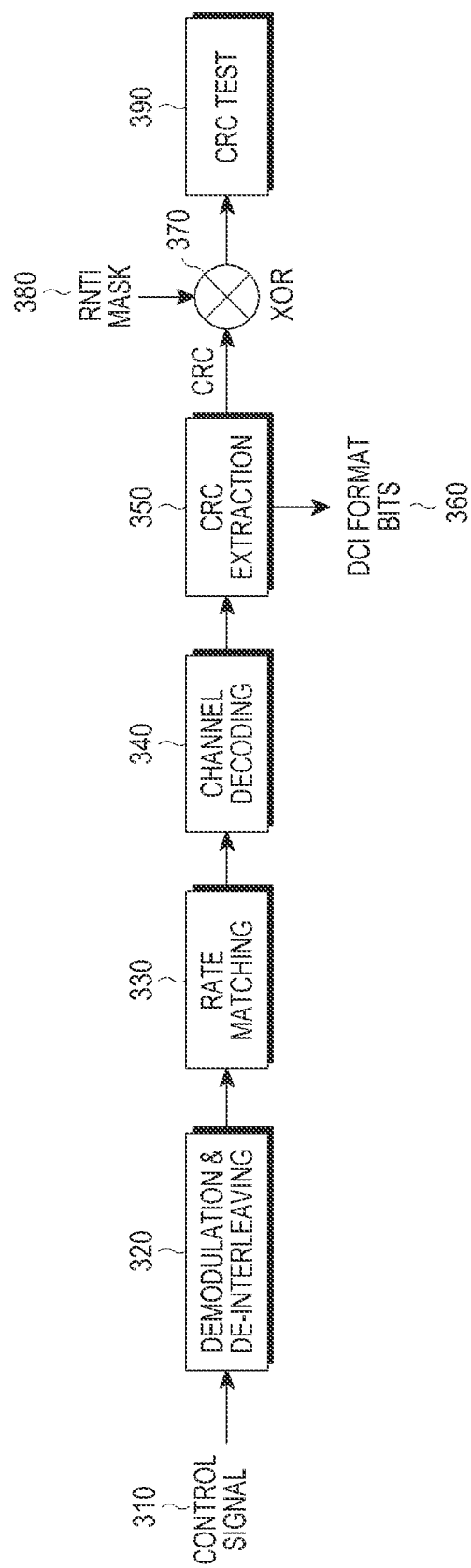
FIG. 3 is a block diagram illustrating a conventional decoding process for a DCI format.
Figure 4:
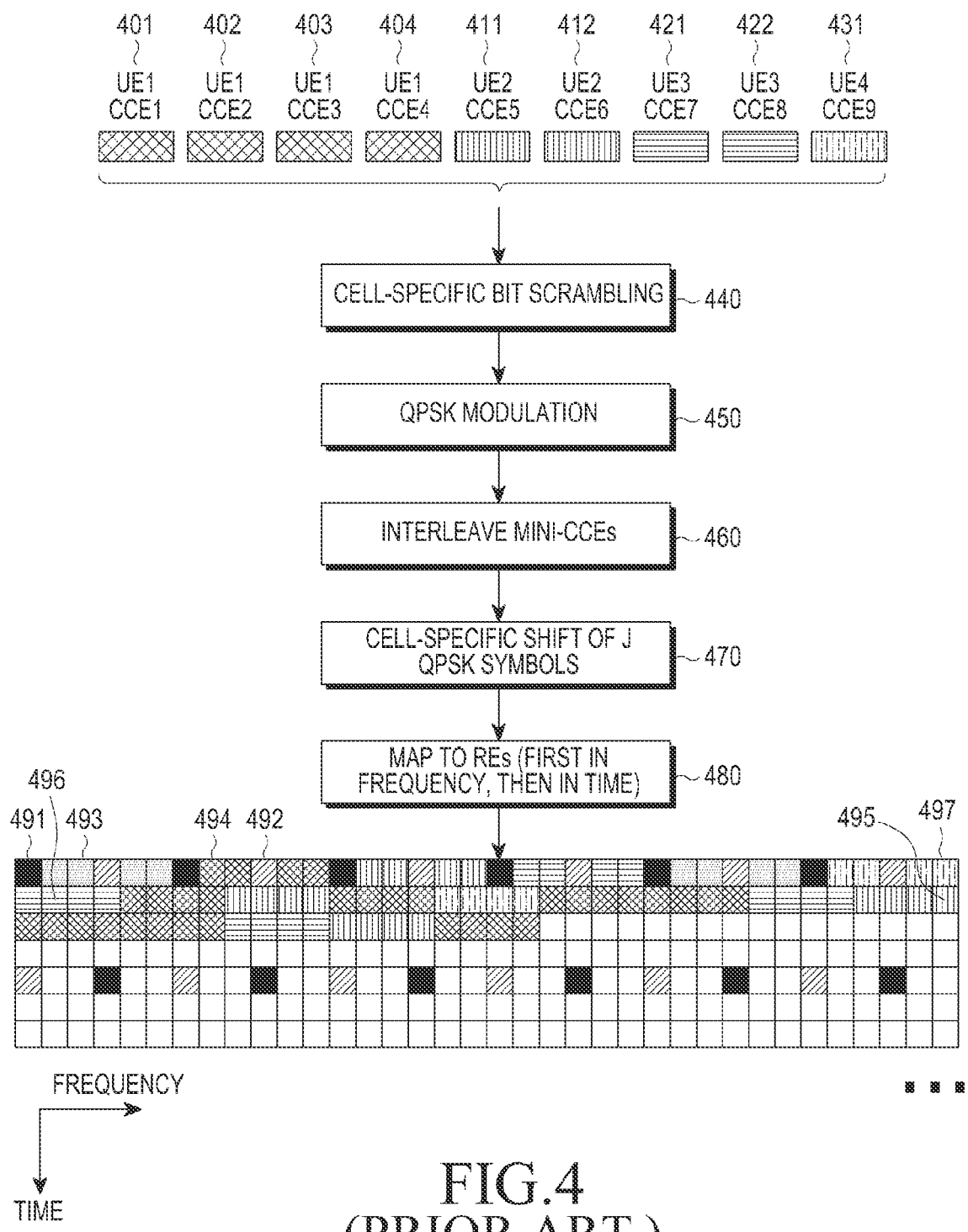
FIG. 4 is a diagram illustrating a conventional transmission process of DCI formats in respective PDCCHs.
Figure 5:
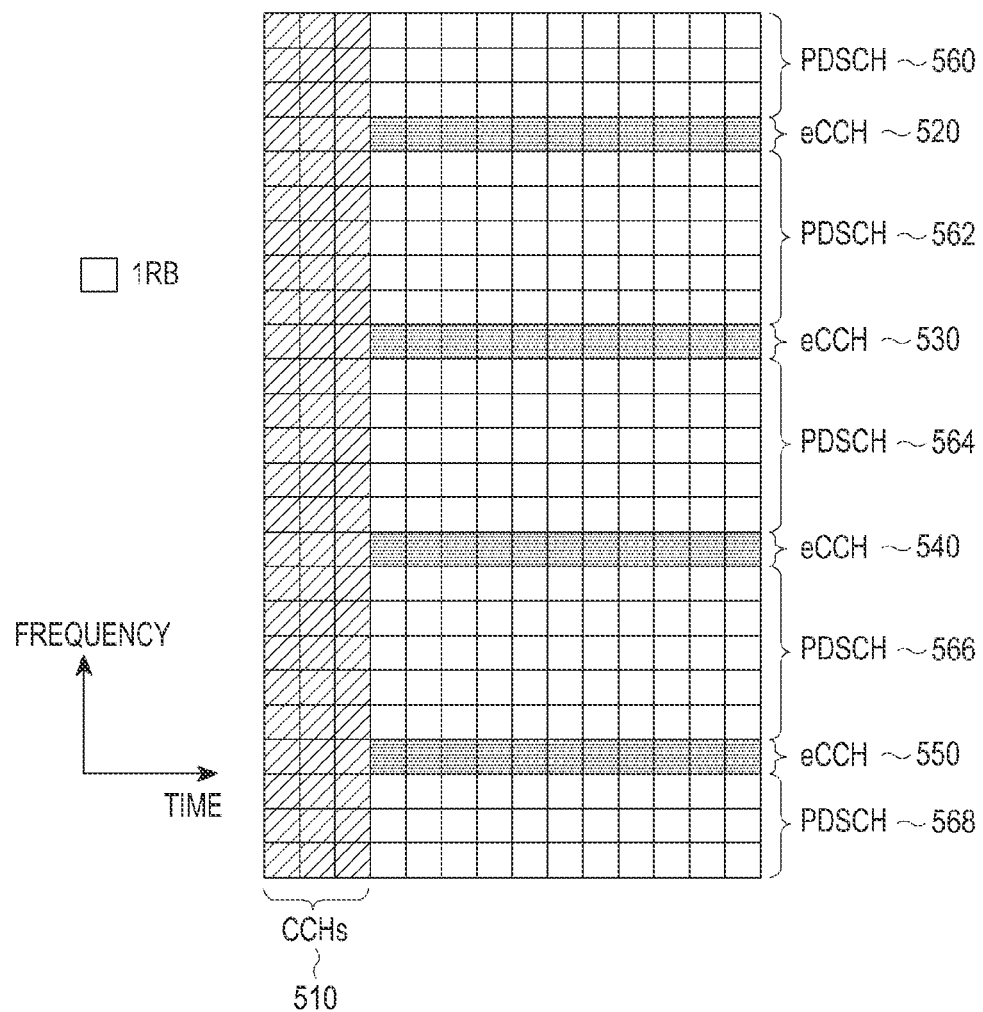
FIG. 5 is a diagram illustrating a conventional allocation of resources for transmitting eCCHs in a DL TTI.
Figure 6:
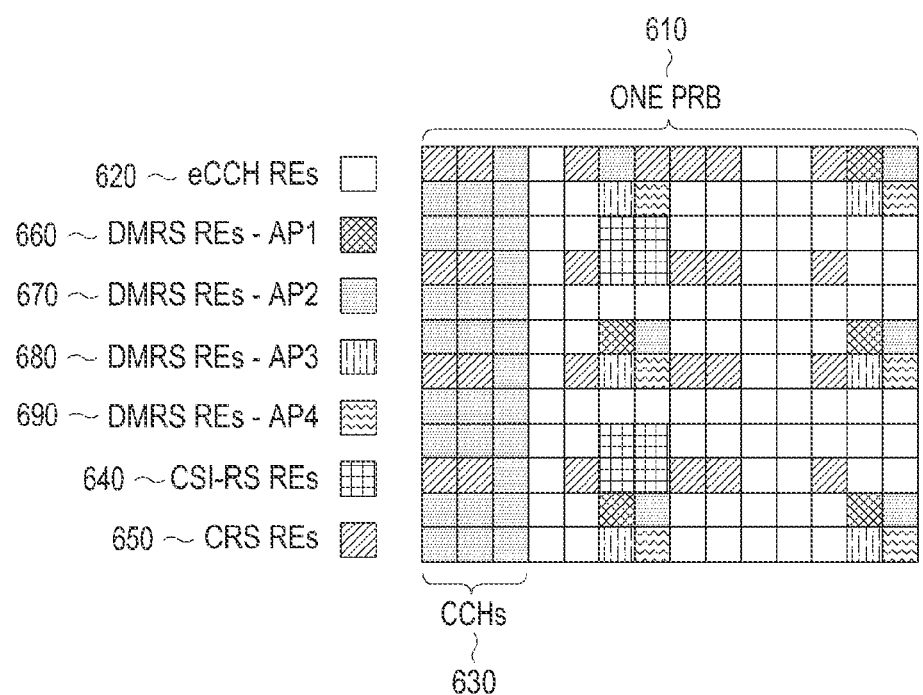
FIG. 6 is a diagram illustrating conventional REs of a PRB for transmitting eCCHs.

Hereinafter, various embodiments of the present invention will be described with reference to the accompanying drawings. In the following description of the present invention, a detailed description of known functions and configurations incorporated herein will be omitted when it may obscure the subject matter of the present invention. The present invention may, however, be embodied in many different forms and should not be construed as limited to the embodiments set forth herein. Rather, these embodiments are provided so that this disclosure will be thorough and complete and will fully convey the scope of the present invention to those skilled in the art.

Additionally, although the embodiments of the present invention will be described below with reference to Orthogonal Frequency Division Multiplexing (OFDM), they also are applicable to all Frequency Division Multiplexing (FDM) transmissions in general and to Discrete Fourier Transform (DFT)-spread OFDM in particular.

An aspect of the present invention considers methods and apparatuses to enhance a channel estimate obtained by a DMRS for demodulating an eCCH, to enable a UE to determine a presence of a minimum set of PRBs and a location for each PRB in the minimum set of PRBs, and to enable assignments of different DMRS scrambling sequences to eCCHs associated with various types of control information such as UE-common control information and UE-specific control information and assignments of different scrambling sequences for the respective different types of control information.

In accordance with an embodiment of the invention, enhancements are provided to an accuracy of a DMRS-based channel estimate which a UE obtains for an eCCH demodulation and an indication to a UE of a minimum set of PRBs used for transmitting eCCHs.

In a first approach, the UE can assume that a set of PRBs always conveys transmissions of eCCHs across subframes. This set of PRBs will be referred to as the minimum set of PRBs. For example, the UE can assume that the minimum set of PRBs is used to transmit interleaved ePDCCHs, or ePCFICH, or ePHICH, or their combinations across subframes. The minimum set of PRBs can be used to transmit interleaved ePDCCHs for DCI formats conveying the UE-common control information and, depending on resource availability, can also be used to transmit ePDCCHs for DCI formats conveying UE-specific control information.

The subframes, which the UE can assume to contain the minimum set of PRBs, can include all subframes or can include a subset of subframes, in a set of subframes, that can either be informed to a UE in advance through broadcast signaling or predefined in a network operation. For example, the UE can assume that the minimum set of PRBs is always included in every first subframe, or in every sixth subframe, or in both the first and sixth subframes of every frame that includes ten subframes. The minimum set of PRBs can be included in additional subframes per frame as informed to the UE by higher layer signaling after the UE establishes communication with a network. Alternatively, if the UE establishes communication with a network using conventional PDCCHs, the minimum set of PRBs for transmitting UE-common control information by ePDCCHs can be informed to the UE by a transmission point through higher layer signaling.

The minimum set of PRBs can also be entirely disabled. Whether the minimum set of PRBs is enabled or disabled can be indicated to the UE by a binary element, Min_PRB_Set_Active, included in a broadcast channel providing essential information (Master Information Block or MIB) which the UE needs to acquire before establishing communication with a network. For example, if Min_PRB_Set is equal to binary value 0, a UE can assume that the minimum set of PRBs is not used to transmit eCCHs while, if Min_PRB_Set is equal to binary value 1, the UE can assume that the minimum set of PRBs is used to transmit eCCHs at respective subframes.

The UE can assume that a same DMRS is transmitted across subframes from a respective AP of a NodeB in a same PRB in the minimum set of PRBs (a different DMRS can be transmitted from the same AP in respective different PRBs in the minimum set of PRBs). A location of the minimum set of PRBs in a DL BW can be informed to the UE by the NodeB either explicitly through signaling of respective information in a broadcast channel or implicitly by a physical identity (PCID) of the NodeB informed to the UE by a signal transmitted from the NodeB, such as a synchronization signal or a discovery signal. The DL BW is informed to the UE by the broadcast channel transmitted in a predetermined number of PRBs for all possible values of the DL BW.

In a first example, for a DL BW including $N_{RB}^{DL}$ RBs and a minimum set of PRBs including $N_{PRB,min}$ PRBs, these PRBs can include the RBs $\{x, \lfloor N_{RB}^{DL}/N_{PRB,min}\rfloor+x, 2\cdot\lfloor N_{RB}^{DL}/N_{PRB,min}\rfloor+x, \ldots, (N_{PRB,min}-1)\cdot\lfloor N_{RB}^{DL}/N_{PRB,min}\rfloor+x\}$, with $x=\text{PCID}\mod\lfloor N_{RB}^{DL}/4\rfloor$, where $\lfloor\ \rfloor$ is the modulo function rounding a number to its lower integer.

In a second example, a broadcast channel can provide an information element Min_PRB_Set_Location including, for example, two binary elements mapping to four respective numerical values and for a value of y (and for a minimum set of $N_{PRB,min}$ PRBs), the PRBs of the minimum set can include the RBs $\{y, \lfloor N_{RB}^{DL}/N_{PRB,min}\rfloor+y, 2\cdot\lfloor N_{RB}^{DL}/N_{PRB,min}\rfloor+y, \ldots, (N_{PRB,min}-1)\cdot\lfloor N_{RB}^{DL}/N_{PRB,min}\rfloor+y\}$.

PRBs in the minimum set can also be partitioned into RB Groups (RBGs). For example, denoting by P a number of PRBs in a RBG, and by $N_{PRB,min}^{RBG}$ a number of PRBs from the minimum set of PRBs in each RBG, $N_{PRB,min}^{RBG}$ PRBs of the minimum set of PRBs can be located in $\lfloor P/N_{PRB\_min}^{RBG}\rfloor$ RBGs. For example, for P=4 PRBs per RBG, for $N_{PRB,min}^{RBG}=2$ PRBs from the minimum set of PRBs in each RBG, and for $N_{PRB,min}=8$, $\lfloor P/N_{PRB\_min}^{RBG}\rfloor=2$ PRBs from the minimum set of PRBs are located in four RBGs. The RBGs can be determined in a similar manner, as previously described, for determining RBs, that is, either from PCID or from Min_PRB_Set_Location. In all cases, a combination of PCID and Min_PRB_Set_Location can also be used to determine a location for PRBs in the minimum set of PRBs.

The UE can assume transmission of a same DMRS in a same PRB from a same AP in different subframes only for an interleaved ePDCCH transmission. The UE cannot assume transmission of a same DMRS in a same PRB from a same AP in different subframes for a PDSCH transmission or for a non-interleaved ePDCCH transmission where, for example, different precoding can apply to a DMRS transmission from a same AP in a same PRB in different subframes. In case interleaved eCCHs and non-interleaved eCCHs are transmitted in a same PRB, according to the present invention, a first set of DMRS APs, which are invariant across subframes, are associated with interleaved eCCHs and a second set of DMRS APs, which are also invariant across subframes, are associated with non-interleaved eCCHs.

Figure 7:
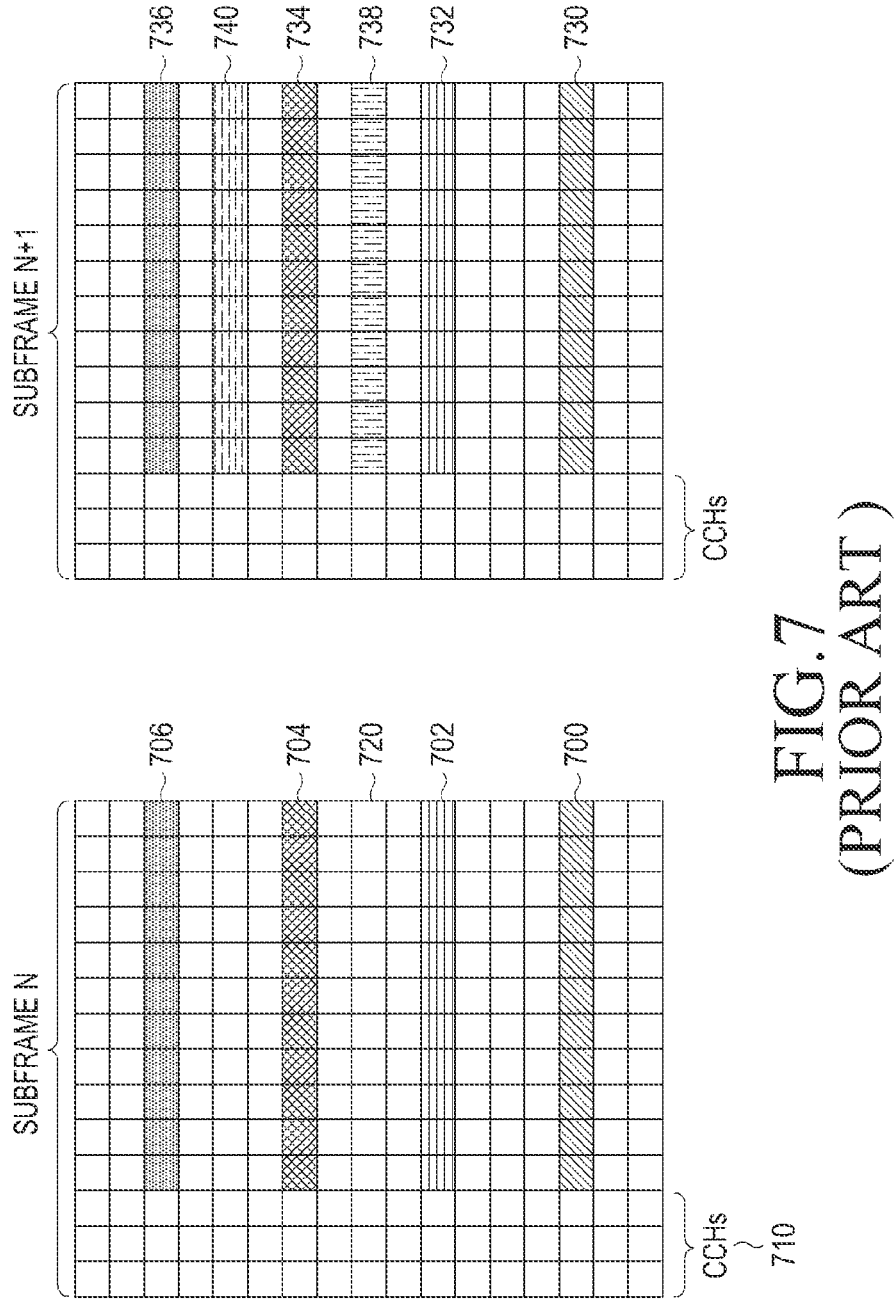
FIG. 7 is a diagram illustrating a conventional configuration of a minimum set of PRBs for transmitting an interleaved eCCH and a transmission of a same DMRS from a respective AP in a same PRB across subframes.

FIG. 7 illustrates a conventional configuration of a minimum set of PRBs for transmitting an interleaved eCCH and a transmission of a same DMRS from a respective AP in a same PRB across subframes.

Referring to FIG. 7, the transmission of an interleaved eCCH is over 4 PRBs, 700, 702, 704, and 706, which constitute the minimum set of PRBs. Conventional CCHs 710 can be transmitted in the beginning of subframe N and some PRBs after the transmissions of conventional CCHs can be used for PDSCH transmissions 720. In subframe N+1, transmission of an interleaved eCCH is over the minimum set of PRBs (as in subframe N) 730, 732, 734, 736, and also includes two additional PRBs 738 and 740. A UE can assume that a same precoding is applied to DMRS transmission from a same AP (associated with transmission of interleaved eCCHs) in a same PRB in different subframes. Therefore, the UE can assume that a same DMRS from a same AP is transmitted respectively in PRBs 700 (in subframe N) and 730 (in subframe N+1), in PRBs 702 (in subframe N) and 732 (in subframe N+1), in PRBs 704 (in subframe N) and 734 (in subframe N+1), and in PRBs 706 (in subframe N) and 736 (in subframe N+1). There is no restriction on the type of precoding applied to DMRS transmission from a same AP in different PRBs of a same subframe and respective DMRS can be different.

A UE receiver can utilize the existence of the minimum set of PRBs (invariable across respective subframes) for transmission of interleaved eCCHs and the transmission, across different subframes, of a same DMRS from a same AP in a respective PRB associated with interleaved eCCHs in obtaining a channel estimate. This channel estimate can then be used for demodulating interleaved eCCHs in such PRBs. The UE can enhance the accuracy of this channel estimate by performing time interpolation for the DMRS from a same AP in a same PRB across different subframes. For example, in subframe N+1 and for a same AP associated with a transmission of an interleaved eCCH, the UE can perform time interpolation for DMRS between PRBs 700 and 730, PRBs 702 and 732, PRBs 704 and 734, and PRBs 706 and 736. The UE cannot apply time interpolation for DMRS in PRBs where an eCCH is transmitted in one subframe but cannot be transmitted in another subframe (such as PRBs 738 and 740 in subframe N+1).

Figure 8:
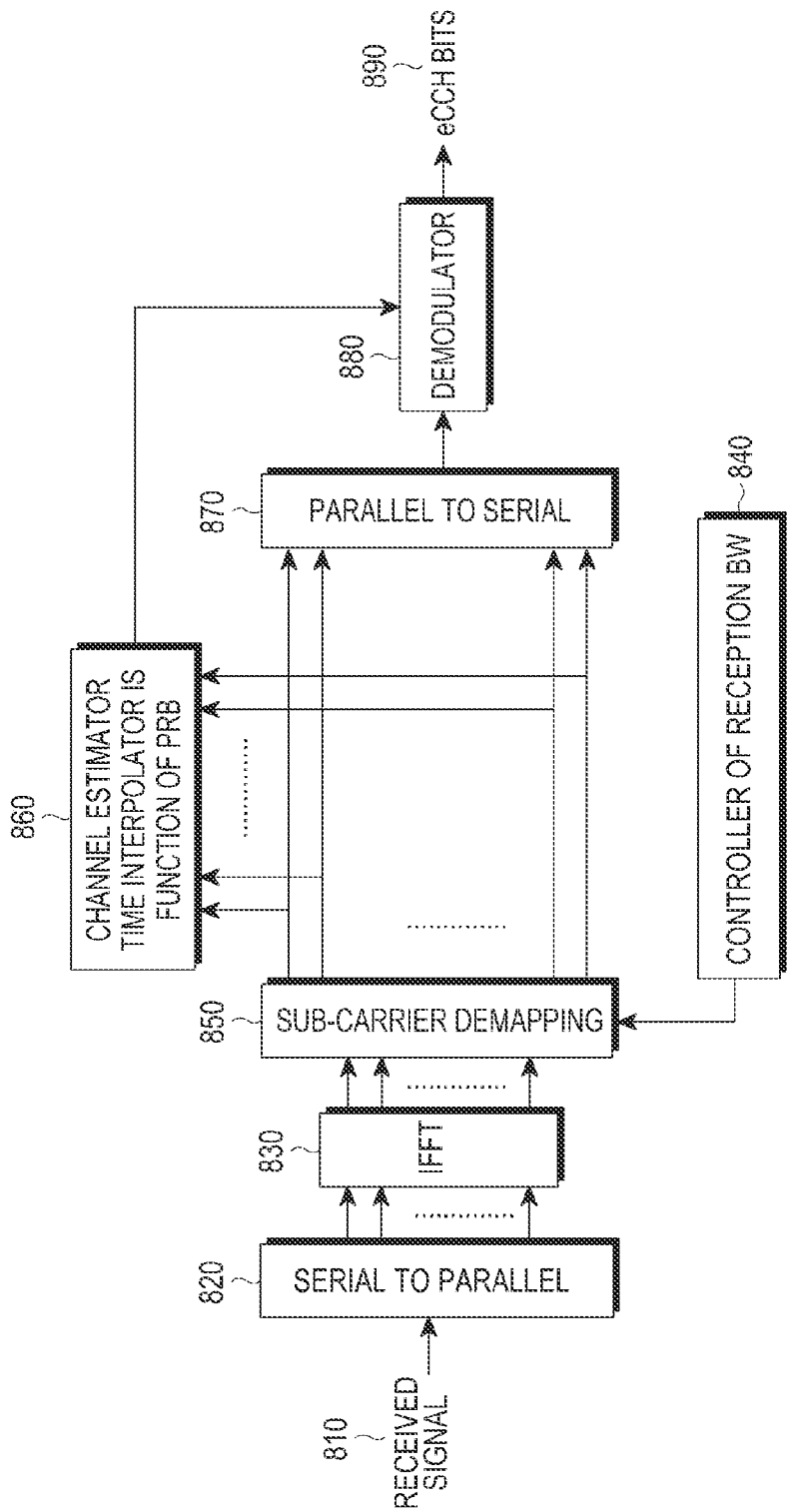
FIG. 8 is a diagram illustrating a UE receiver where a channel estimator unit applies a time interpolator across subframes to a DMRS from a same AP in a same PRB depending on the PRB according to an embodiment of the present invention.

FIG. 8 illustrates a UE receiver in which a channel estimator unit applies a time interpolator across subframes to a DMRS from a same AP in a same PRB depending on the PRB according to an embodiment of the present invention.

Referring to FIG. 8, the UE receives a signal 810 carrying an eCCH and, after some further processing, such as filtering and cyclic prefix removal, the signal is provided to a serial-to-parallel unit 820 and subsequently an FFT is performed by an FFT unit 830. A controller of the reception BW 840 subsequently selects a sub-carrier demapping unit 850. The REs for further processing are provided to a channel estimator 860 and to a parallel-to-serial unit 870. The output of the channel estimator and the output of the parallel-to-serial unit are then provided to a demodulator unit 880 which performs coherent demodulation of the eCCH bits 890 which can then be provided to subsequent processing units such as a deinterleaver and a decoder.

Figure 9:
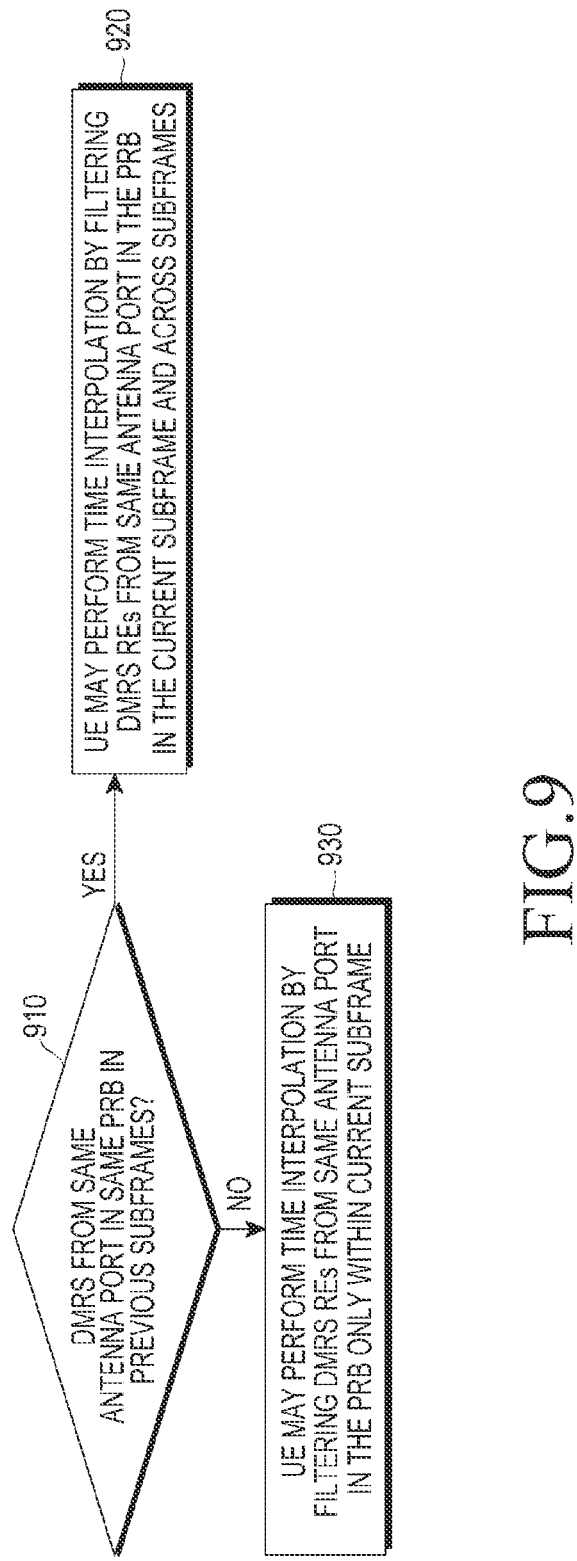
FIG. 9 is a diagram illustrating a decision process for a channel estimator unit at a UE receiver to perform time interpolation of DMRS from a same AP in a same PRB across different subframes according to an embodiment of the present invention.

FIG. 9 illustrates a decision process for a channel estimator unit at a UE receiver to perform time interpolation of DMRS from a same AP in a same PRB across different subframes according to an embodiment of the present invention.

Referring to FIG. 9, a UE first determines, in step 910, whether a PRB containing received DMRS REs from an AP associated with an eCCH transmission in a current subframe is also a PRB containing received DMRS REs from the same AP associated with eCCH transmissions in previous subframes. If it is, the UE can perform, in step 920, time interpolation by filtering DMRS REs (after performing descrambling of the DMRS scrambling sequence) from the AP in the PRB across the subframes (including the current subframe). For example, the UE can base the decision to perform time interpolation by considering a Doppler shift that it measures, which can be indicative of channel variation in the time domain. If the PRB containing received DMRS REs from an AP associated with an eCCH transmission in a current subframe is not the PRB containing received DMRS REs from the same AP associated with eCCH transmissions in previous subframes, the UE cannot perform time interpolation across subframes for the DMRS REs from the AP in the PRB and instead considers, in step 930, only the DMRS REs from the AP in the PRB in the current subframe for time interpolation in obtaining a channel estimate.

If a NodeB does not use the minimum set of PRBs for transmissions of interleaved eCCHs in all subframes, the time interpolation that the UE can perform by filtering DMRS REs can actually result in a worse channel estimate. To prevent this event from occurring, the UE can perform such DMRS interpolation only if it is accordingly configured by the NodeB. For example, the UE can perform such DMRS interpolation only if it is indicated that it can do so by a parameter (DMRS_interpolate) consisting of one binary element that is provided by a NodeB through higher layer signaling.

The first approach described above considered enhancements in an estimate of a channel associated with an interleaved eCCH transmission only in a number of same PRBs (minimum set of PRBs) that are always used for eCCH transmissions across subframes (unless reconfigured by higher layer signaling).

In a second approach, as will be described below, the UE can use information obtained in every subframe to determine PRBs used for transmitting interleaved ePDCCHs based on a ePCFICH that is transmitted in the minimum set of PRBs and for informing a UE of additional PRBs, if any, from a predetermined set of PRBs that are used for transmitting interleaved ePDCCHs in a same subframe as described in U.S. Provisional Patent Application No. 61/497,330, titled "Extension of a Physical Downlink Control Channel in a Communication System."

Figure 10:
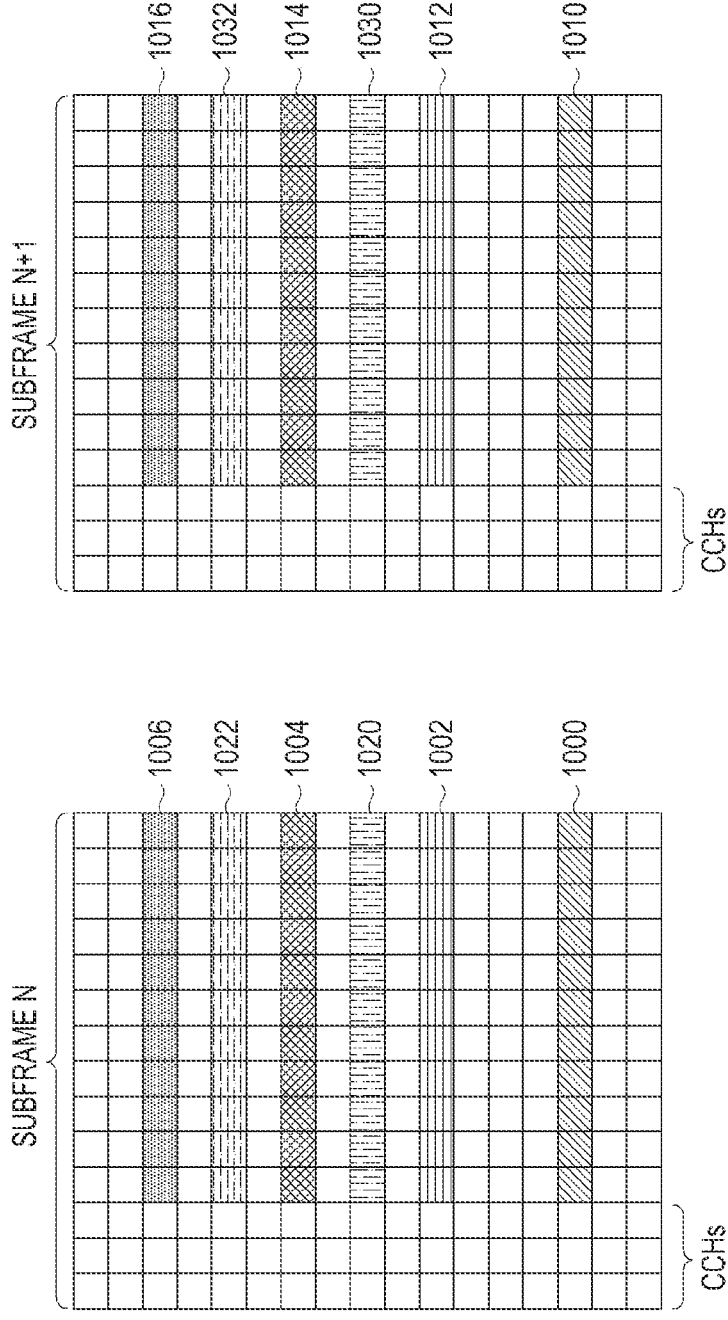
FIG. 10 is a diagram illustrating a realization of PRBs used for transmitting interleaved eCCHs in two subframes according to an embodiment of the present invention.

FIG. 10 illustrates a realization of PRBs used for transmitting interleaved eCCHs in two subframes according to an embodiment of the present invention.

Referring to FIG. 10, four PRBs, 1000, 1002, 1004, and 1006 in subframe N and the same four PRBs 1010, 1012, 1014, and 1016 in subframe N+1 constitute a minimum set of PRBs which a UE can assume to exist across subframes (unless re-configured by higher layer signaling). The additional two PRBs 1020 and 1022 in subframe N and the same two PRBs 1030 and 1032 in subframe N+1 are indicated to a UE through an ePCFICH transmitted in the minimum set of PRBs.

One approach to improve the accuracy of an estimate for a channel experienced by a transmission of an interleaved ePDCCH in PRBs 1030 and 1032 would be to perform time interpolation between the respective DMRS REs and the DMRS REs in PRBs 1020 and 1022 for a same AP. However, this would introduce dependence between ePDCCH detection in subframe N+1 and ePCFICH detection in subframe N (in order for the UE to know that PRBs 1020 and 1022 are used for transmitting interleaved ePDCCHs). If the UE did not detect an interleaved ePDCCH in subframe N, such dependence would not be desirable as the UE can have incorrectly decoded an ePCFICH in subframe N and an assumption that PRBs 1020 and 1022 were used for transmitting interleaved ePDCCH may not be correct. If the UE did detect an interleaved ePDCCH in subframe N, it is also highly probable that it correctly detected an ePCFICH in subframe N and using PRBs 1020 and 1022 to improve the accuracy of a channel estimate in PRBs 1030 and 1032 can be beneficial. Therefore, generalizing the first approach of the first embodiment of the invention for enhancing the reliability of detecting an interleaved eCCH, according to the second approach, a same DMRS is transmitted from a same AP in a same PRB in different subframes when the PRB (not only in the minimum set of PRBs) conveys interleaved eCCHs.

According to an embodiment of the invention, an assignment of a scrambling sequence for a DMRS transmission from an AP depending on a respective search space for an associated eCCH transmission.

Since the UE cannot be aware of UE-specific information before establishing access with a network, an ePDCCH conveying a DCI format providing UE-common control information needs to be associated with a DMRS using a UE-common scrambling sequence which can be derived, for example, from a physical identity of the TP which the UE obtains after acquiring a synchronization signal or after subsequently obtaining broadcast system information. Even after establishing access with the network, according to the present invention, DMRS associated with ePDCCHs conveying a DCI format providing UE-common control information, such as a DCI format with CRC scrambled with a TPC-ANTI, a SI-RNTI, and so on, use a UE-common scrambling sequence. The same holds true for DMRS associated with other possible eCCHs, such as an ePHICH or an ePCFICH, which need to be decoded by multiple UEs. In a special case of ePDCCHs conveying DCI formats providing UE-specific control information, the invention considers that a UE-common sequence is used to scramble the associated DMRS if these ePDCCHs are transmitted in an eCSS. The REs of respective eCCHs can also be scrambled with a respective UE-common sequence. Therefore, according to the present invention, a UE-common sequence is used to scramble a DMRS associated with an ePDCCH in PRBs of an eCSS or with an ePCFICH or with an ePHICH and that a UE-common sequence is used to scramble the REs of an ePDCCH in PRBs of an eCSS.

Conversely, after establishing access with the network, the UE can be informed of (either dynamically per subframe or semi-statically by higher layer signaling) the PRBs of a respective enhanced UE-DSS (UE-eDSS) for transmitting (interleaved or non-interleaved) ePDCCHs conveying UE-specific information. The UE can then also be configured by higher layer signaling with a UE-specific sequence for the scrambling of the associated DMRS. The REs of respective eCCHs (ePDCCHs) can also be scrambled with a respective UE-specific sequence.

For example, a UE-common DMRS scrambling sequence can be initialized as $c_{init}=(\lfloor n_s/2 \rfloor +1)\cdot(2X+1)\cdot 2^{16}+n_{SCID}$ where $n_s$ is a subframe slot number, X is a UE-common parameter, such as a TP identity, and $n_{SCID}$ is a UE-common scrambling sequence identity which can be set to a value such as zero or can also depend on the TP identity (for example, it can be zero for an even TP identity and one for an odd TP identity or vice versa). A UE-specific DMRS scrambling sequence can be also initialized as $c_{init}=(\lfloor n_s/2 \rfloor +1)\cdot(2X+1)\cdot 2^{16}+n_{SCID}$ where $n_s$ is again a subframe slot number, X is a UE-specific parameter, and $n_{SCID}$ is a scrambling sequence identity which can also be UE-specific (or it can again be UE-common as previously described).

A consequence of scrambling a first DMRS associated with ePDCCHs transmitted in an eCSS (or with an ePHICH or ePCFICH) with a UE-common sequence and scrambling a second DMRS associated with, either interleaved or non-interleaved, ePDCCHs in a UE-eDSS with a UE-specific sequence is that either separate antenna ports or different PRBs need to be used for transmitting each of the two respective DMRS corresponding to the two types of scrambling sequences.

Figure 11:
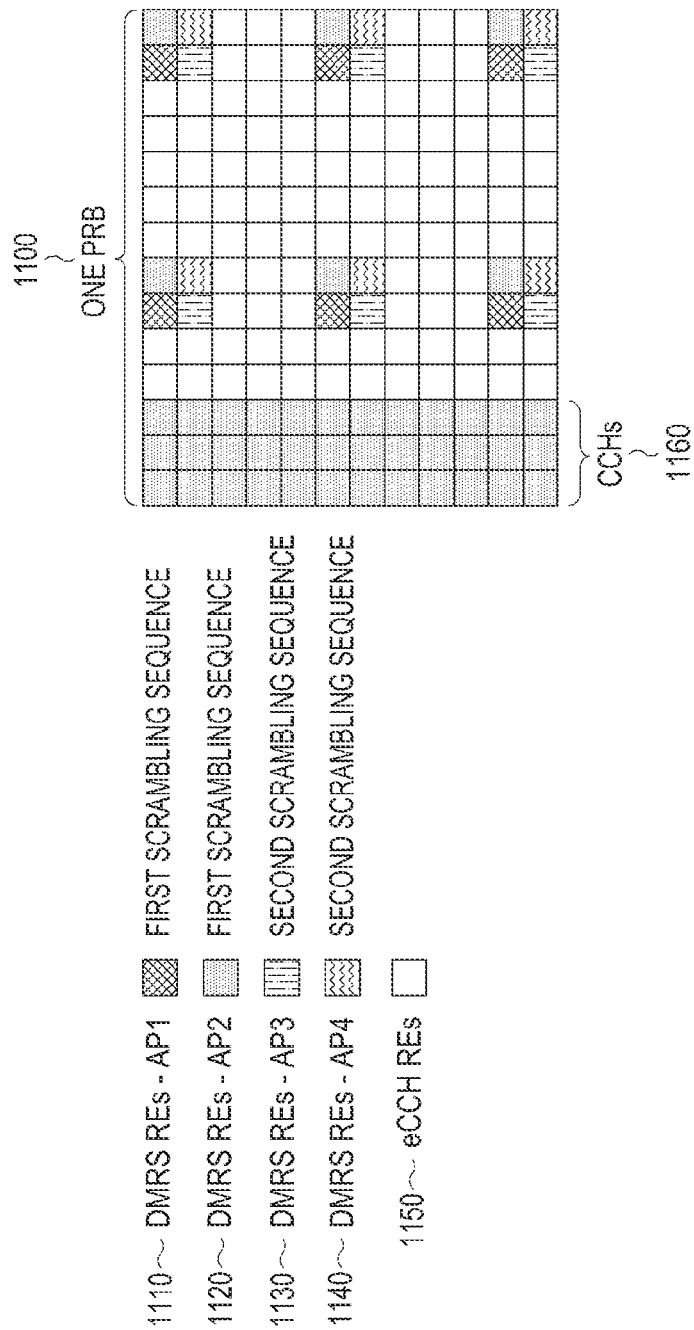
FIG. 11 is a diagram illustrating a use of two sequences for scrambling DMRS from different APs, respectively associated with ePDCCHs in an eCSS or with ePDCCHs in a UE-eDSS, in a same PRB according to an embodiment of the present invention.

FIG. 11 illustrates a use of two sequences for scrambling DMRS from different APs, respectively associated with ePDCCHs in an eCSS or with ePDCCHs in a UE-eDSS, in a same PRB according to an embodiment of the present invention.

Referring to FIG. 11, and ignoring for simplicity the presence of signals such as a CRS or a CSI-RS, in a PRB 1100, a first scrambling sequence is applied to DMRS transmitted from a first set of APs, such as AP1 1110 and AP2 1120, and a second scrambling sequence is applied to DMRS transmitted from a second set of APs, such as AP3 1130 and AP4 1140. The remaining REs in the PRB are used to transmit eCCHs 1150 and possibly, CCHs 1160. The eCCH transmissions associated with the first set of APs can only be in an eCSS and the respective first scrambling sequence can be UE-common. The eCCH transmissions (either interleaved ePDCCHs or non-interleaved ePDCCHs) associated with the second set of APs can only be in a UE-eDSS and the respective second scrambling sequence can be UE-specific.

Figure 12:
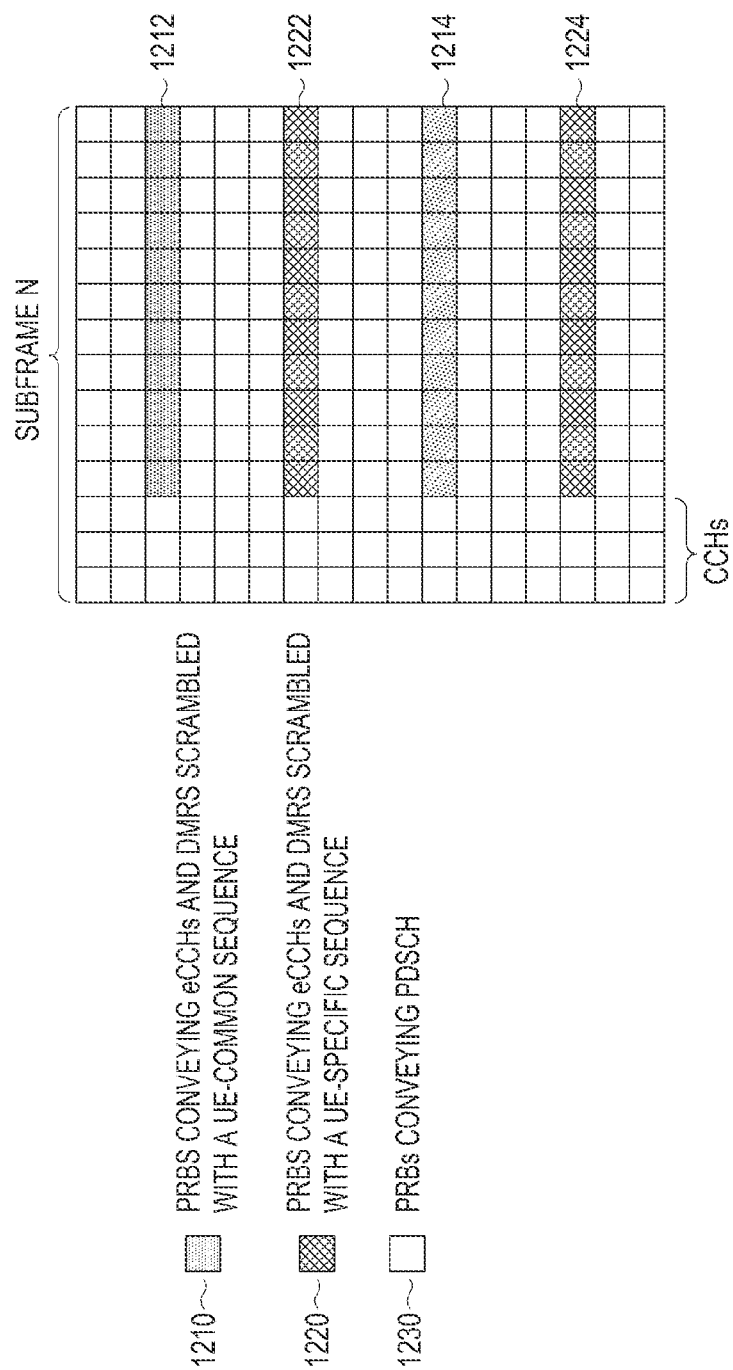
FIG. 12 is a diagram illustrating a use of two scrambling sequences by same DMRS APs in different PRBs according to an embodiment of the present invention.

FIG. 12 illustrates a use of two scrambling sequences by same DMRS APs in different PRBs according to an embodiment of the present invention.

Referring to FIG. 12, a first scrambling sequence 1210 is applied to DMRS in a first set of PRBs 1212 and 1214 associated with eCCHs in an eCSS. A second scrambling sequence 1220 is applied to DMRS in a second set of PRBs 1222 and 1224 associated with eCCHs in a UE-eDSS.

A consequence of assigning a first set of PRBs for transmitting eCCHs in an eCSS may be, for example, the first set of PRBs can be the same as the minimum set of PRBs as previously described. A consequence of assigning a second set of PRBs for transmitting eCCHs (ePDCCHs) in a UE-eDSS is that the resources in the two sets of PRBs cannot be shared for the transmission of a same eCCH. One reason for entirely confining a transmission of an eCCH in an eCSS in the first set of PRBs is because a UE should be able to detect the eCCH without relying on being configured according to UE-specific information such as the second set of PRBs or the sequence used to scramble the DMRS in the second set of PRBs. One reason for entirely confining a transmission of an eCCH in a UE-eDSS in the second set of PRBs is because the TPs for the second set of PRBs can be different than the TPs in the first set of PRBs. So, allowing an eCCH in a UE-eDSS to also be transmitted in the first set of PRBs can result in unequal detection reliability between respective REs in the first set of PRBs and in the second set of PRBs and complicate link adaptation for the eCCH transmission.

According to the present invention, the eCCEs in the first set of PRBs and the eCCEs in the second set of PRBs are not jointly considered in constructing an eCSS or a UE-eDSS. Instead, an ePDCCH transmission in an eCSS is entirely contained within the first set of PRBs and an ePDCCH transmission in a UE-eDSS is entirely contained within the second set of PRBs. Separate UE-DSSs can be defined for interleaved ePDCCHs and for non-interleaved ePDCCHs in the second set of PRBs if these two ePDCCH transmission types are multiplexed in a same set of PRBs. This is markedly different from the conventional operation in which all CCEs are jointly considered in constructing a CSS or a UE-DSS. This also differs greatly from the case in which different DMRS APs in a same PRB are respectively associated with ePDCCHs in an eCSS and ePDCCHs in a UE-eDSS in that, according to the present invention, the UE-eDSS can include all eCCEs in assigned PRBs while the eCSS can still be confined in only the first set of PRBs.

Figure 13:
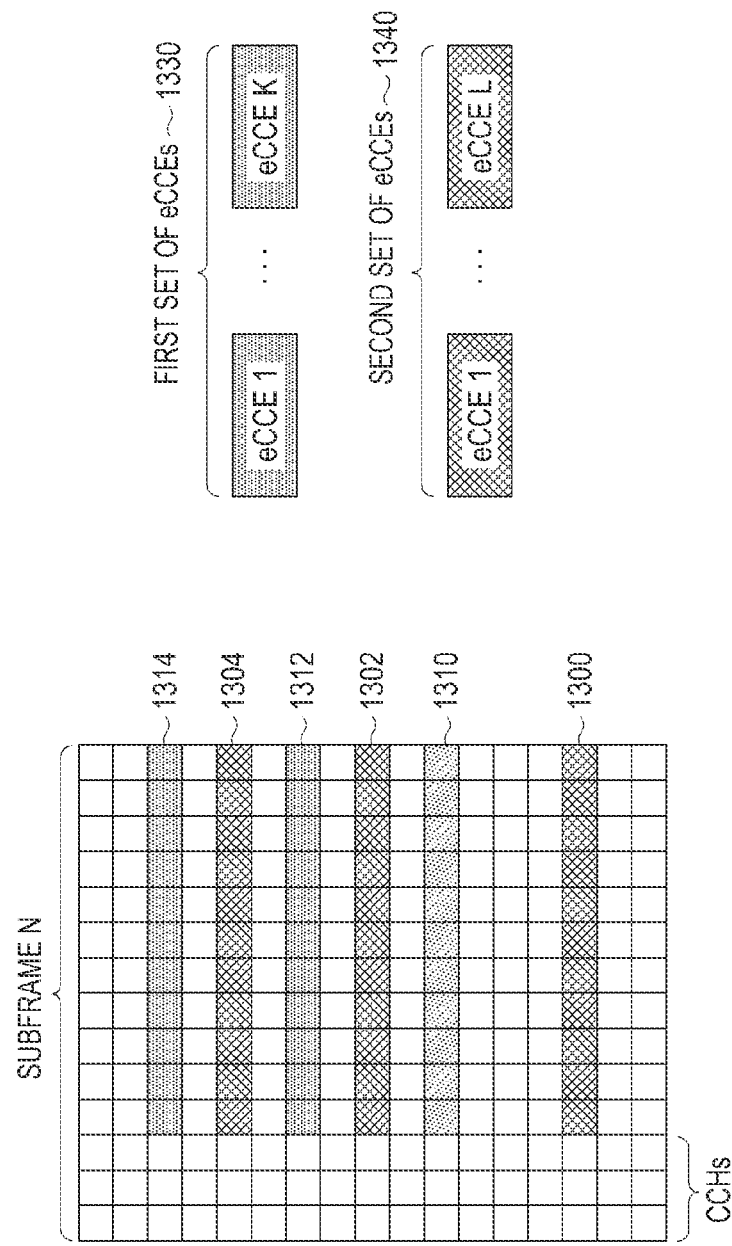
FIG. 13 is a diagram illustrating a separation of search spaces for transmitting an ePDCCH according to an embodiment of the present invention.

FIG. 13 illustrates a separation of search spaces for transmitting an ePDCCH according to an embodiment of the present invention.

Referring to FIG. 13, a UE is assigned a first set of PRBs 1300, 1302, and 1304 for transmission of ePDCCHs in an eCSS and a second set of PRBs 1310, 1312, 1314 for transmission of ePDCCHs in a UE-eDSS in subframe N. The eCSS in the first set of PRB pairs is associated with a first set of individually numbered eCCEs 1330 and a UE-eDSS (either for interleaved ePDCCHs or for interleaved ePDCCHs) in the second set of PRB pairs is associated with a second set of individually numbered eCCEs 1340. An ePDCCH transmission is contained entirely either within the first set of PRBs or within the second set of PRBs.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method performed by a user equipment (UE), the method comprising:
receiving, from a transmission point, a broadcast signal;
determining a first set of physical resource blocks (PRBs) for a first physical downlink control channel (PDCCH) based on the broadcast signal;
determining a second set of PRBs for a second PDCCH based on a higher layer signaling;
receiving, from the transmission point, first downlink control information (DCI) on a first PDCCH in the first set of PRBs; and
receiving, from the transmission point, second DCI on a second PDCCH in the second set of PRBs,
wherein a cyclic redundancy check (CRC) of the first DCI is associated with a system information-radio network temporary identifier (SI-RNTI),
wherein a CRC of the second DCI is associated with a cell-RNTI (C-RNTI),
wherein a reference signal (RS) is determined based on an identity of the transmission point, in a case that the RS is received in the first set of PRBs, and wherein the RS is determined based on the higher layer signaling, in a case that the RS is received in the second set of PRBs.

2. The method of claim 1, wherein the broadcast signal includes information indicating a time resource associated with the first set of PRBs, and wherein the time resource corresponds to a transmission time interval (TTI).

3. The method of claim 1, wherein the first PDCCH is associated with common control information, and wherein the second PDCCH is associated with UE-specific control information.

4. The method of claim 1, wherein the broadcast signal includes information indicating a first location of the first set of PRBs.

5. The method of claim 1, wherein the broadcast signal includes a master information block.

6. A method performed by a transmission point, the method comprising:

transmitting, to a user equipment (UE), a broadcast signal;

determining a first set of physical resource blocks (PRBs) for a first physical downlink control channel (PDCCH) based on the broadcast signal;

determining a second set of PRBs for a second PDCCH based on a higher layer signaling;

transmitting, to the UE, first downlink control information (DCI) on a first PDCCH in the first set of PRBs; and transmitting, to the UE, second DCI on a second PDCCH in the second set of PRBs, wherein a cyclic redundancy check (CRC) of the first DCI is associated with a system information-radio network temporary identifier (SI-RNTI), wherein a CRC of the second DCI is associated with a cell-RNTI (C-RNTI), wherein a reference signal (RS) is associated with an identity of the transmission point, in a case that the RS is transmitted in the first set of PRBs, and wherein the RS is associated with the higher layer signaling, in a case that the RS is transmitted in the second set of PRBs.

7. The method of claim 6, wherein the broadcast signal includes information indicating a time resource associated with the first set of PRBs, and wherein the time resource corresponds to a transmission time interval (TTI).

8. The method of claim 6, wherein the first PDCCH is associated with common control information, and wherein the second PDCCH is associated with UE-specific control information.

9. The method of claim 6, wherein the broadcast signal includes information indicating a first location of the first set of PRBs.

10. The method of claim 6, wherein the broadcast signal includes a master information block.

11. A user equipment (UE), comprising:

a transceiver; and a controller configured to:

receive, from a transmission point, via the transceiver, a broadcast signal, determine a first set of physical resource blocks (PRBs) for a first physical downlink control channel (PDCCH) based on the broadcast signal, determine a second set of PRBs for a second PDCCH based on a higher layer signaling, receive, from the transmission point, via the transceiver, first downlink control information (DCI) on a first PDCCH in the first set of PRBs, and receive, from the transmission point, via the transceiver, second DCI on a second PDCCH in the second set of PRBs, wherein a cyclic redundancy check (CRC) of the first DCI is associated with a system information-radio network temporary identifier (SI-RNTI), wherein a CRC of the second DCI is associated with a cell-RNTI (C-RNTI), wherein a reference signal (RS) is determined based on an identity of the transmission point, in a case that the RS is received in the first set of PRBs, and wherein the RS is determined based on the higher layer signaling, in a case that the RS is received in the second set of PRBs.

12. The UE of claim 11, wherein the broadcast signal includes information indicating a time resource associated with the first set of PRBs, and wherein the time resource corresponds to a transmission time interval (TTI).

13. The UE of claim 11, wherein the first PDCCH is associated with common control information, and wherein the second PDCCH is associated with UE-specific control information.

14. The UE of claim 11, wherein the broadcast signal includes information indicating a first location of the first set of PRBs.

15. The UE of claim 11, wherein the broadcast signal includes a master information block.

16. A transmission point, comprising:

a transceiver; and a controller configured to:

transmit, to a user equipment (UE), via the transceiver, a broadcast signal, determine a first set of physical resource blocks (PRBs) for a first physical downlink control channel (PDCCH) based on the broadcast signal, determine a second set of PRBs for a second PDCCH based on a higher layer signaling, transmit, to the UE, via the transceiver, first downlink control information (DCI) on a first PDCCH in the first set of PRBs, and transmit, to the UE, via the transceiver, second DCI on a second PDCCH in the second set of PRBs, wherein a cyclic redundancy check (CRC) of the first DCI is associated with a system information-radio network temporary identifier (SI-RNTI), wherein a CRC of the second DCI is associated with a cell-RNTI (C-RNTI), wherein a reference signal (RS) is associated with an identity of the transmission point, in a case that the RS is transmitted in the first set of PRBs, and wherein the RS is associated with the higher layer signaling, in a case that the RS is transmitted in the second set of PRBs.

17. The transmission point of claim 16, wherein the broadcast signal includes information indicating a time resource associated with the first set of PRBs, and wherein the time resource corresponds to a transmission time interval (TTI).

18. The transmission point of claim 16, wherein the first PDCCH is associated with common control information, and wherein the second PDCCH is associated with UE-specific control information.

19. The transmission point of claim 16, wherein the broadcast signal includes information indicating a first location of the first set of PRBs.

20. The transmission point of claim 16, wherein the broadcast signal includes a master information block.

\* \* \* \* \*